(12) United States Patent
Hiramatsu et al.

(10) Patent No.: US 11,489,980 B2
(45) Date of Patent: Nov. 1, 2022

(54) RECORDING DEVICE WITH INTEGRATED PLACEMENT SURFACE AND GUIDE SURFACE

(71) Applicant: SEIKO EPSON CORPORATION, Tokyo (JP)

(72) Inventors: Hiroyuki Hiramatsu, Shiojiri (JP); Ryuichi Sato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/229,545

(22) Filed: Apr. 13, 2021

(65) Prior Publication Data

US 2021/0329139 A1 Oct. 21, 2021

(30) Foreign Application Priority Data

Apr. 16, 2020 (JP) .............................. JP2020-073348

(51) Int. Cl.
*H04N 1/04* (2006.01)
*H04N 1/00* (2006.01)

(52) U.S. Cl.
CPC ..... *H04N 1/00615* (2013.01); *H04N 1/00602* (2013.01); *H04N 1/00551* (2013.01); *H04N 1/0461* (2013.01)

(58) Field of Classification Search
CPC ........... H04N 1/00761; H04N 1/00615; H04N 1/00602; H04N 1/00551; H04N 1/0461
USPC ........ 358/400, 401, 474, 498, 496, 488, 296
See application file for complete search history.

(56) References Cited

U.S. PATENT DOCUMENTS

| 5,267,009 | A | 11/1993 | Takada et al. |
| 6,102,506 | A * | 8/2000 | Sasai ................... H04N 1/00631 347/3 |
| 7,341,387 | B2 * | 3/2008 | Nishimura ......... H04N 1/00525 399/377 |
| 8,797,613 | B2 * | 8/2014 | Sato ....................... H04N 1/193 399/110 |
| 9,694,998 | B2 * | 7/2017 | Lee ....................... B65H 3/0684 |
| 2005/0134940 | A1 * | 6/2005 | Shyu ................... H04N 1/00554 358/474 |
| 2011/0211223 | A1 * | 9/2011 | Ito ........................... G03G 15/60 399/125 |
| 2013/0056925 | A1 * | 3/2013 | Hsu ........................... B65H 1/04 271/171 |
| 2015/0304513 | A1 * | 10/2015 | Tu ...................... H04N 1/00408 358/1.13 |
| 2019/0256309 | A1 | 8/2019 | Shiota |

(Continued)

FOREIGN PATENT DOCUMENTS

| JP | H05-006042 | 1/1993 |
| JP | 2019-142648 | 8/2019 |
| JP | 2019-172426 | 10/2019 |

*Primary Examiner* — Cheukfan Lee
(74) *Attorney, Agent, or Firm* — Workman Nydegger

(57) ABSTRACT

A recording device includes an imaging module that reads a sheet placed in a reading position, a placement surface at which the sheet is placed, a first guide surface that guides an edge in the width direction of the sheet placed on the placement surface, and a nip roller pair that nips the sheet on the placement surface to transport the sheet to the reading position. The placement surface includes a first placement surface including the reading position, and a second placement surface not including the reading position, and the first placement surface, the first guide surface, and the nip roller pair move in an integrated manner.

4 Claims, 9 Drawing Sheets

(56) References Cited

U.S. PATENT DOCUMENTS

2019/0306356 A1 10/2019 Watanabe et al.
2021/0024306 A1* 1/2021 Shuto ...................... B65H 1/04

* cited by examiner

RECORDING DEVICE WITH INTEGRATED PLACEMENT SURFACE AND GUIDE SURFACE

The present application is based on, and claims priority from JP Application Serial Number 2020-073348, filed Apr. 16, 2020, the disclosure of which is hereby incorporated by reference herein in its entirety.

BACKGROUND

1. Technical Field

The present disclosure relates to a recording device.

2. Related Art

In related art, a recording device provided with a scanner that reads images and the like is known. In JP-A-05-6042, a recording device is disclosed whose top surface is a placement surface at which a medium to be read is placed. The recording device includes a guide surface that guides an edge in the width direction of the medium to be read placed at the placement surface, and a transport unit that transports the medium to be read set on the placement surface.

However, in the recording device disclosed in JP-A-05-6042, when the top surface is opened for maintenance or the like, the placement surface on which the medium to be read is placed moves relative to the guide surface. At this time, there is a risk that a posture of the medium to be read once set on the placement surface may change as a result of an end portion of the medium to be read sliding with respect to the guide surface.

SUMMARY

A recording device comprising includes an imaging module configured to read a medium to be read placed in a reading position, a placement surface at which the medium to be read is placed, a first guide surface configured to guide an edge in a width direction of the medium to be read placed at the placement surface, and a nip roller pair configured to nip the medium to be read at the placement surface and transport the medium to be read to the reading position. The placement surface includes a first placement surface including the reading position, and a second placement surface not including the reading position, and the first placement surface, the first guide surface, and the nip roller pair move in an integrated manner.

DESCRIPTION OF EXEMPLARY EMBODIMENTS

Figure 1:
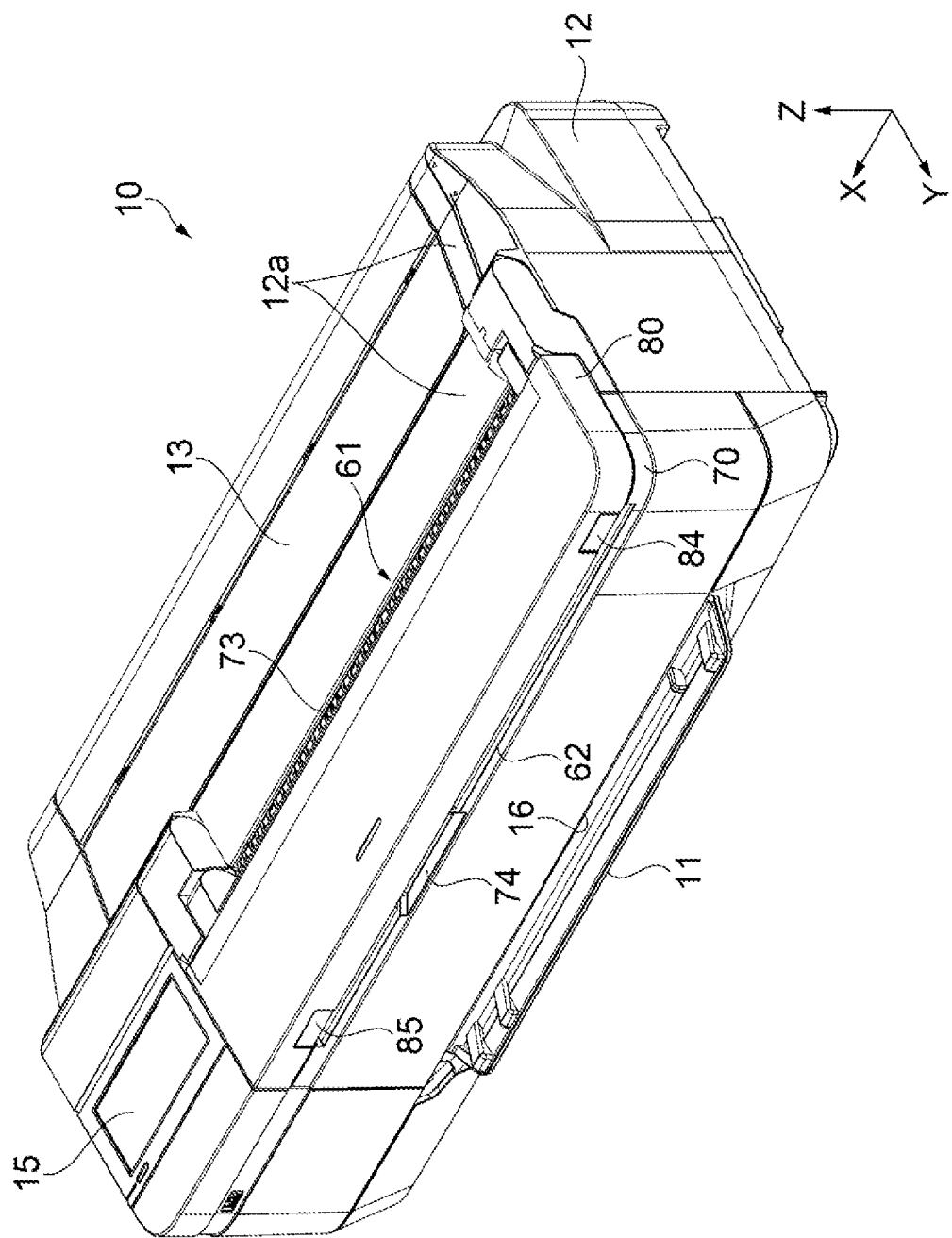
FIG. 1 is a perspective view of a recording device according to an embodiment.

A schematic configuration of a recording device 10 according to an embodiment will be described. The recording device 10 is, for example, an inkjet-type printer provided with a scanner that reads images and the like. In the coordinates illustrated in the drawings, three virtual axes orthogonal to each other are denoted as X, Y, and Z axes, based on the assumption that the recording device 10 is placed on a horizontal surface. The Y axis is an axis parallel to a front-rear direction of the recording device 10, and a tip side of an arrow indicating the Y axis is defined as "front". The X-axis is an axis parallel to a left-right direction of the recording device 10, and a tip side of an arrow indicating the X axis is defined as "left". The Z-axis is an axis parallel to the vertical direction, and a tip side of an arrow indicating the Z axis is defined as "up".

As illustrated in FIG. 1, the recording device 10 is a printer that can form an image on a sheet S as a recording medium. The recording device 10 can form an image on a relatively large roll paper as large as A1 size of the JIS standards, as the sheet S. Further, the recording device 10 can also form an image on a single sheet paper of A4 size or the like, as the sheet S.

Figure 2:
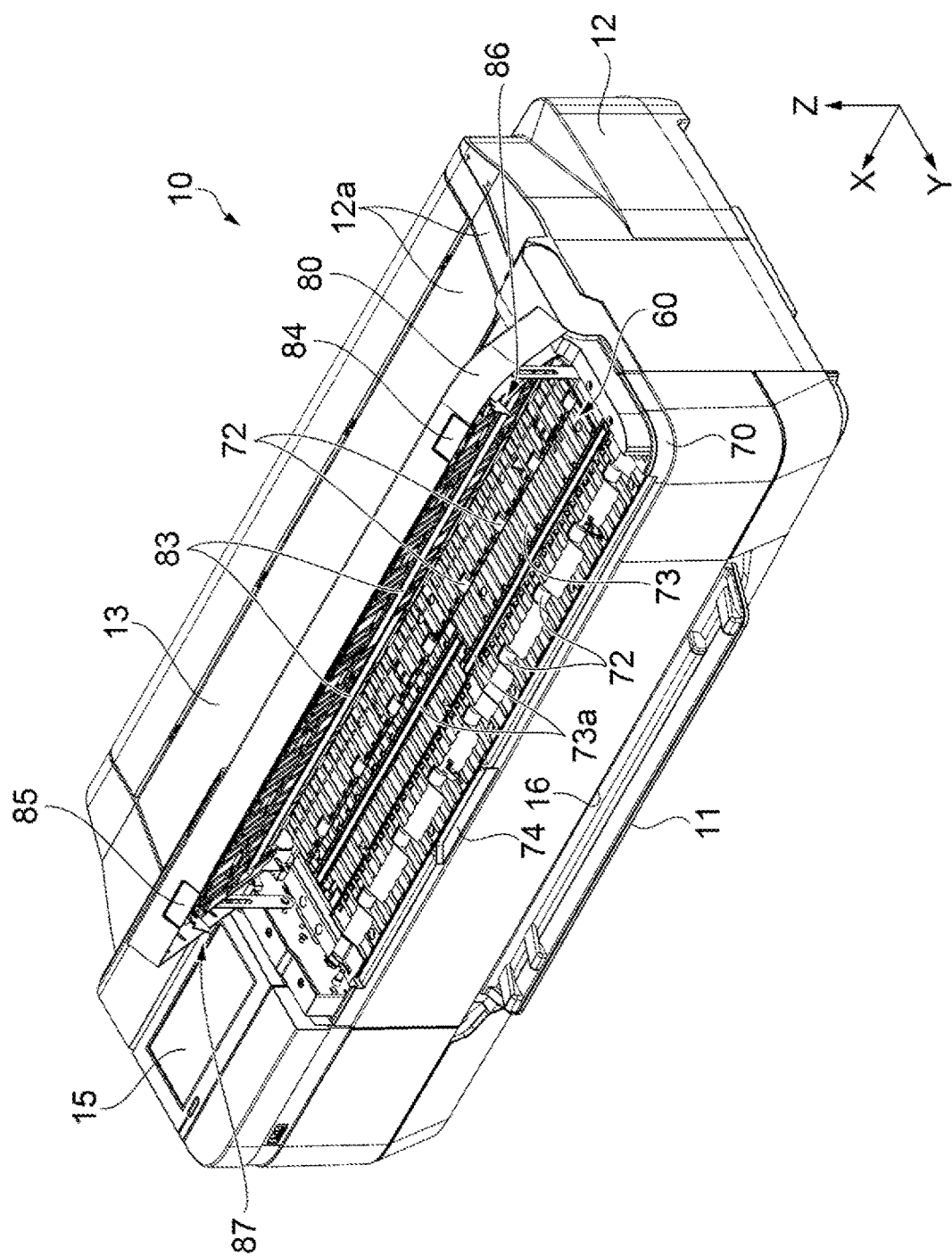
FIG. 2 is a perspective view illustrating the recording device in a state in which a second cover is positioned in a second open position.
Figure 3:
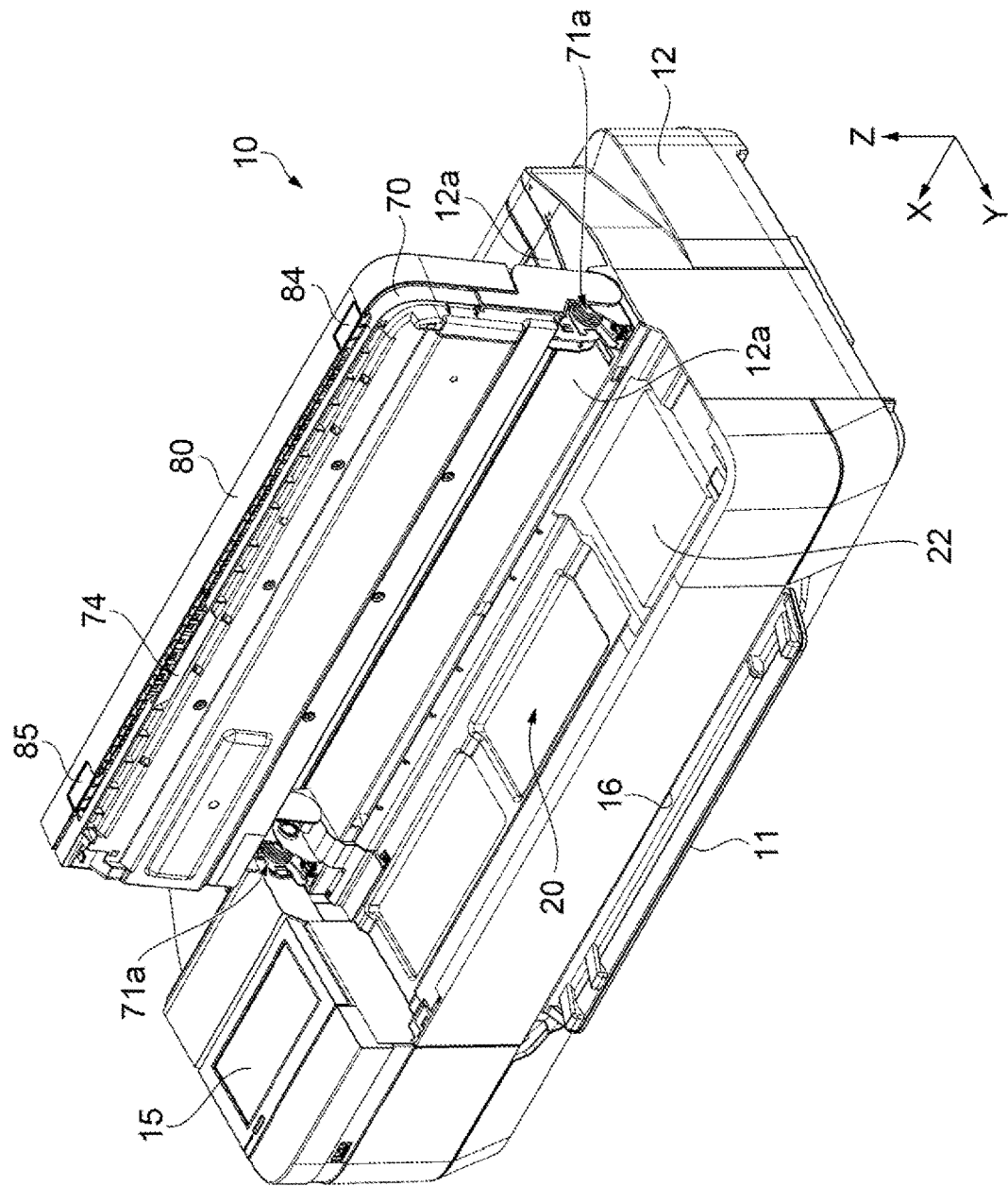
FIG. 3 is a perspective view illustrating the recording device in a state in which a first cover is positioned in a first open position.

As illustrated in FIG. 1 to FIG. 3, the recording device 10 includes a substantially cuboid-shaped housing 12 that is long in the left-right direction. On an upper surface of the housing 12, a paper feed cover 13 is located on the rear side, and a first cover 70 and a second cover 80, as printer covers, are located on the front side. The paper feed cover 13, the first cover 70, and the second cover 80 can be opened and closed. In a position adjacent to the second cover 80 in the X axis direction on the upper surface of the housing 12, an operating panel 15 is provided that is used for performing various operations of the recording device 10. A paper discharge port 16 is provided in a front surface of the housing 12. The sheet S, on which an image or the like has been recorded in the housing 12, is discharged from the paper discharge port 16 toward the front. Further, on the front surface of the housing 12, a paper discharge unit 11 is provided that supports the sheet S discharged from the paper discharge port 16.

Figure 4:
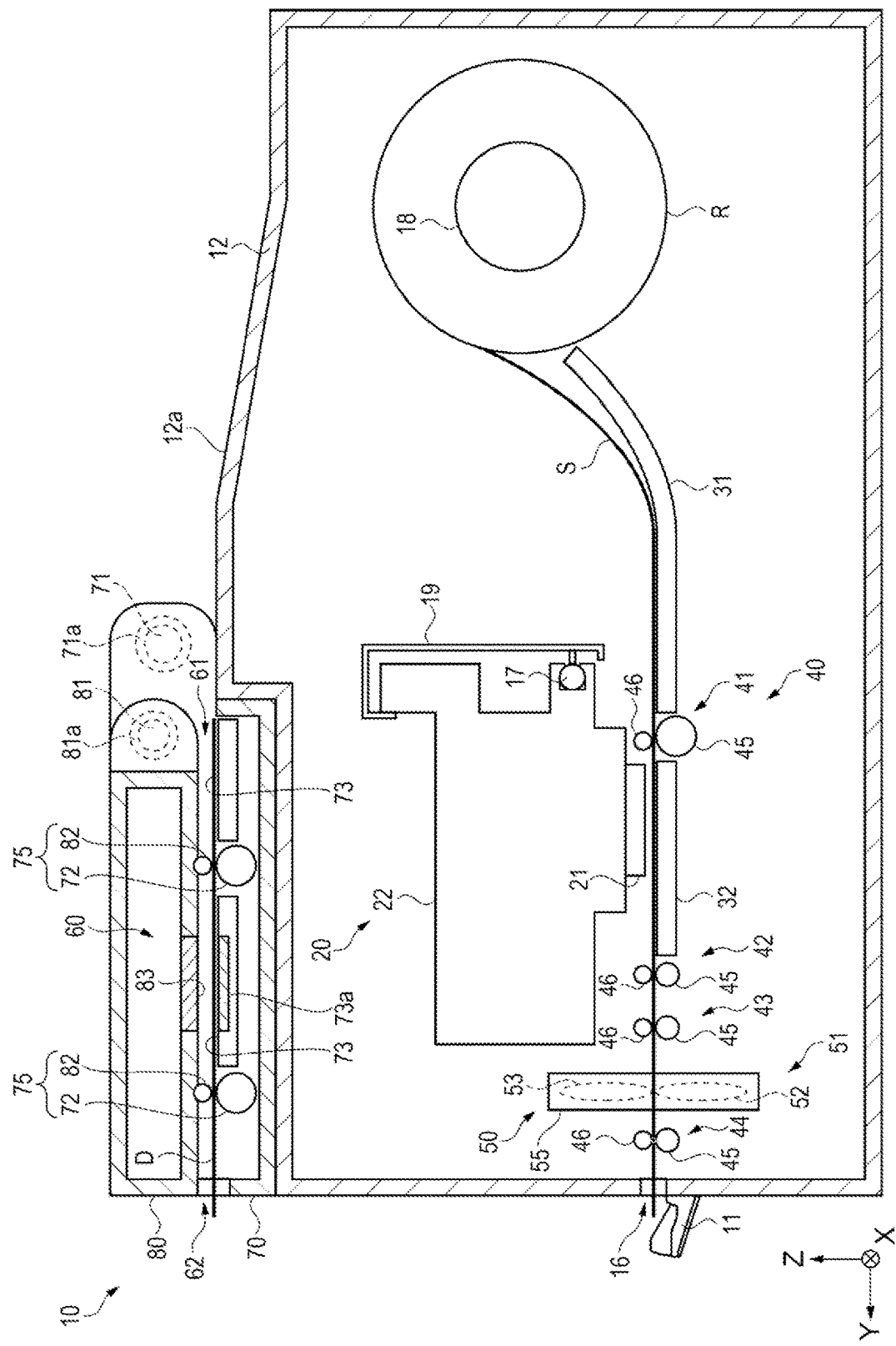
FIG. 4 is a schematic cross-sectional view illustrating an internal configuration of the recording device.

As illustrated in FIG. 4, a roll body R in which the sheet S is wound in a roll shape is disposed in the housing 12. The roll body R is disposed on the rear side in the housing 12. The roll body R is rotatably supported by a shaft 18 extending in the left-right direction parallel to the width direction of the sheet S. In this embodiment, the sheet S is unwound from the roll body R as a result of the shaft 18 being rotated in the counterclockwise direction in FIG. 4. The unwound sheet S is transported by a transport unit 40 and discharged from the interior of the housing 12 to the outside of the housing 12 through the paper discharge port 16 that opens to the front surface of the housing 12. In other words, in this embodiment, a path on which the unwound sheet S is transported to the paper discharge port 16 by the transport unit 40 is a transport path, and a direction from the rear to the front of the housing 12, that is, a direction from the right to the left in FIG. 4 is a transport direction of the sheet S transported by the transport unit 40.

The recording device 10 includes a recording unit 20 that performs recording on the sheet S, the transport unit 40 that transports the sheet S along the transport path, a cutting mechanism 50 that cuts the sheet S, and a reading unit 60 that reads a sheet D, which is a medium to be read.

The recording unit 20 includes a head 21 that ejects a liquid, such as ink, toward the sheet S, and a carriage 22 on which the head 21 is mounted. The carriage 22 is supported by a frame 19 provided in the housing 12 and a guide shaft 17 attached to the frame 19. The guide shaft 17 extends in the width direction of the sheet S. The carriage 22 is movable along the guide shaft 17 by a drive source such as a motor. In other words, the carriage 22 can reciprocate in the width direction. The head 21 can eject ink over an entire region in the width direction of the sheet S as a result of the carriage 22 moving along the guide shaft 17. Note that a configuration in which the liquid is supplied from a cartridge that can be mounted on the carriage 22, or a configuration in which the liquid is supplied from a bottle or a tank provided inside or outside the housing 12 may be adopted.

A first support member 31 and a second support member 32 are plate-like members and configure the transport path of the sheet S. The second support member 32 is disposed so as to face the head 21 of the recording unit 20. The first support member 31 is disposed upstream of the second support member 32 in the transport direction, and guides the sheet S unwound from the roll body R toward the recording unit 20.

The transport unit 40 transports the sheet S unwound from the roll body R from the interior of the housing 12 toward the paper discharge port 16, along the first and second support members 31 and 32. The transport unit 40 includes a first transport roller pair 41, a second transport roller pair 42, a third transport roller pair 43, and a fourth transport roller pair 44 in this order, from upstream to downstream in the transport direction. The first transport roller pair 41 is disposed upstream of the head 21 in the transport direction, and is disposed between the first support member 31 and the second support member 32. The second, third, and fourth transport roller pairs 42, 43, and 44 are disposed downstream of the head 21 in the transport direction.

The first transport roller pair 41 includes a driving roller 45 that can be driven to rotate by a motor (not illustrated), and a driven roller 46 that can be driven to rotate by the rotation of the driving roller 45. By the driving roller 45 rotating with the sheet S nipped between the driving roller 45 and the driven roller 46, the sheet S is transported by the first transport roller pair 41. The driven roller 45 is disposed so as to come into contact with the sheet S from below. The driven roller 46 is disposed so as to come into contact with the sheet S from above. Similarly to the first transport roller pair 41, the second, third, and fourth transport roller pairs 42, 43, and 44 each include the driving roller 45 and the driven roller 46. Therefore, when transporting the sheet S, the driven rollers 46 of the second, third, and fourth transport roller pairs 42, 43, and 44 come into contact with a surface of the sheet S onto which the liquid has been ejected. Thus, the driven rollers 46 of the second, third, and fourth transport roller pairs 42, 43, and 44 are each configured by a star wheel or the like having a small contact area with respect to the sheet S, in order to reduce deterioration of the quality of the image recorded on the sheet S. The first to fourth transport roller pairs 41, 42, 43, and 44 are respectively disposed in a plurality thereof at a predetermined interval in the width direction.

The cutting mechanism 50 is disposed between the third transport roller pairs 43 and the fourth transport roller pairs 44 in the transport direction. The sheet S cut by the cutting mechanism 50 is discharged from the paper discharge port 16 as a result of being transported by the fourth transport roller pairs 44. Note that the recording device 10 according to this embodiment is configured to have a relatively small gap in the vertical direction in an opening of the paper discharge port 16, so that a finger of a user cannot be inserted into the housing 12 from the paper discharge port 16. Thus, by disposing the fourth transport roller pairs 44 in the vicinity of the upstream side of the paper discharge port 16, the sheet S can be smoothly transported toward the paper discharge port 16, and occurrence of a paper jam can be suppressed.

The cutting mechanism 50 includes a cutting blade 51 for cutting the sheet S and a holding body 55 that holds the cutting blade 51. The cutting blade 51 is configured by a driving blade 52 and a driven blade 53 each having a disk-like shape. The driving blade 52 and the driven blade 53 are rotatably attached to the holding body 55. The driving blade 52 and the driven blade 53 are provided so as to be arranged side by side in the vertical direction. The holding body 55 can reciprocate along the X axis direction. The cutting mechanism 50 cuts the sheet S using the cutting blade 51 by moving the holding body 55 along the X axis direction. In other words, the cutting mechanism 50 including the cutting blade 51 cuts the sheet S by scanning in the width direction intersecting the transport direction of the sheet S.

Note that the cutting mechanism 50 may be caused to reciprocate along the X axis direction by a driving force transmitted from a drive source, such as a motor, provided in the cutting mechanism 50, or the cutting mechanism 50 may be caused to reciprocate along the X axis direction by a driving force of a motor for moving the carriage 20.

The reading unit 60 is configured by the first cover 70 and the second cover 80, and includes an imaging module 83 that reads recording information of the sheet D positioned between the first cover 70 and the second cover 80. The first cover 70 has a rectangular shape that is long in the left-right direction, is movable with respect to the recording unit 20, and is configured to be able to open the recording unit 20. The first cover 70 moves to a first open position that opens a space into which the sheet S to be recorded by the recording part 20 is transported, and to a first closed position that closes the space into which the sheet S is transported. The first cover 70 according to this embodiment is positioned above the recording unit 20, and is engaged with the housing 12 so as to be able to pivot about first support shafts 71. The first support shafts 71 are pivoting shafts parallel to the X axis, and are provided in both left and right end portions at the rear end of the first cover 70. The first cover 70 in the first closed position moves to the first open position as a result of the front end of the first cover 70 pivoting upward and rearward about the first support shafts 71 in an arc shape. The first support shaft 71 is provided with a coil spring 71a that holds the first cover 70 in the first open position. The coil spring 71a is wound around the outer circumference of each of the left and right first support shafts 71, and urges the first cover 70 to be in the first open position.

The second cover 80 has a rectangular shape that is long in the left-right direction, and is configured to be movable with respect to the first cover 70. The second cover 80 moves to a second open position that opens a space in which the imaging module 83 is provided, and to a second closed position that closes the space in which the imaging module 83 is provided. The second cover 80 according to this embodiment is positioned in a position overlapping with the first cover 70 in the second closed position. The second cover 80 is engaged with the first cover 70 so as to be able to pivot about second support shafts 81. The second support shafts 81 are pivoting shafts parallel to the X axis, and are provided in both left and right end portions at the rear end of the second cover 80. The second cover 80 in the second closed position moves to the second open position as a result of the front end of the second cover 80 pivoting upward and rearward about the second support shafts 81 in an arc shape. The second support shaft 81 is provided with a coil spring 81a that holds the second cover 80 in the second open position. The coil spring 81a is wound around the outer circumference of each of the left and right second support shafts 81, and urges the second cover 80 to be in the second open position.

The reading unit 60 is provided with an insertion port 61 into which the sheet D is inserted and a discharge port 62 from which the sheet D is discharged, in a state in which the first cover 70 and the second cover 80 are both in their closed positions. The insertion port 61 is provided between the first cover 70 and the second cover 80 at the rear end of the second cover 80. The discharge port 62 is provided between the first cover 70 and the second cover 80 at the front end of the second cover 80. A direction from the insertion port 61 toward the discharge port 62 is a transport direction of the sheet D.

The reading unit 60 includes a first placement surface 73 on which the sheet D is placed, first rollers 72 and second rollers 82 that transport the sheet D, and the imaging module 83 that converts an image of the sheet D into electrical signals. The imaging module 83 is provided on a lower surface of the second cover 80, and includes a close contact optical line-type image sensor that is long in the width direction of the sheet D, a light source, a lens, and the like. The first placement surface 73 is provided on an upper surface of the first cover 70 and includes a reading position. The reading position is a position facing the imaging module 83, and a plate-like support plate 73a that supports the sheet D being transported is provided in the reading position. The imaging module 83 is provided on the lower surface of the second cover 80, and reads the sheet D positioned in the reading position on the first placement surface 73. The first rollers 72 are provided on the upper surface of the first cover 70, that is, on the first placement surface 73, and the second rollers 82 are provided on the lower surface of the second cover 80. Further, a plurality of sensors for determining the size and position of the sheet D are provided in the reading unit 60.

In the second closed position in which the second cover 80 is closed with respect to the first cover 70, the first rollers 72 are provided upstream and downstream of the imaging module 83 in the transport direction of the sheet D, and are provided at an appropriate interval in the width direction of the sheet D. In the second closed position in which the second cover 82 is closed, the second rollers 82 are provided in positions in which they come into contact with the first rollers 72. The first roller 72 is driven to rotate by a drive source such as a motor, and the second roller 82 is driven to rotate by the rotational drive of the first roller 72. The first roller 72 and the second roller 82 configure a nip roller pair 75 that nips the sheet D on the first placement surface 73 and transports the sheet D to the reading position.

The not yet read sheet D inserted from the insertion port 61 is nipped between the first roller 72 and the second roller 82 and is transported to a reading start position. Then, when a reading start operation is performed, the sheet D is sequentially transported toward the discharge port 62, and the sheet D that has been read by the imaging module 83 is discharged from the discharge port 62 toward the front. A range, including a region in the width direction of the sheet D, from the insertion port 61 to the discharge port 62 is a transport path on which the sheet D is transported.

The recording device 10 includes a first coupling portion 86 and a second coupling portion 87 that couple the first cover 70 and the second cover 80. The first coupling portion 86 is provided on the outer side of one side of the transport path in the width direction of the sheet D. The second coupling portion 87 is provided on the outer side of the other side of the transport path in the width direction of the sheet D. Further, on the right-hand side of a front surface of the second cover 80, a first operating portion 84 is provided that causes the first coupling portion 86 to be switched between a coupled state and an uncoupled state. On the left-hand side of the front surface of the second cover 80, a second operating portion 85 is provided that causes the second coupling portion 87 to be switched between the coupled state and the uncoupled state. By the user performing an operation of pressing the first and second operating portions 84 and 85, the first and second coupling portions 86 and 87 are switched from the coupled state, in which the first cover 70 and the second cover 80 are coupled to each other, to the uncoupled state. When the tip of the second cover 80 positioned in the second closed position is pivoted upward and rearward in a state in which the first and second operating portions 84 and 85 are pressed by the user, the second cover 80 is pivoted with respect to the first cover 70 and positioned in the second open position. As a result, maintenance can be performed on the reading unit 60 that is open.

The recording device 10 includes a gripping portion 74 that is gripped when opening the first cover 70. As illustrated in FIG. 1 and FIG. 2, the gripping portion 74 is configured by causing a central portion on the front surface of the first cover 70 to be recessed to the rear. When opening the first cover 70, the user inserts his/her finger into the gripping portion 74 to grip the lower edge of the front surface of the second cover 80 positioned in the second closed position. At this time, since the operation of pressing the first and second operating portions 84 and 85 is not performed, the coupled state between the first cover 70 and the second cover 80 is maintained. When the tip of the second cover 80 is pivoted upward and rearward while the user is gripping the gripping portion 74, the first cover 70 coupled to the second cover 80 is also pivoted with respect to the recording unit 20 and positioned in the first open position. Thus, maintenance can be performed on the recording unit 20 that is open.

Next, a configuration of placement surfaces and a first guide surface 91 included in the first cover 70 will be described.

Figure 5:
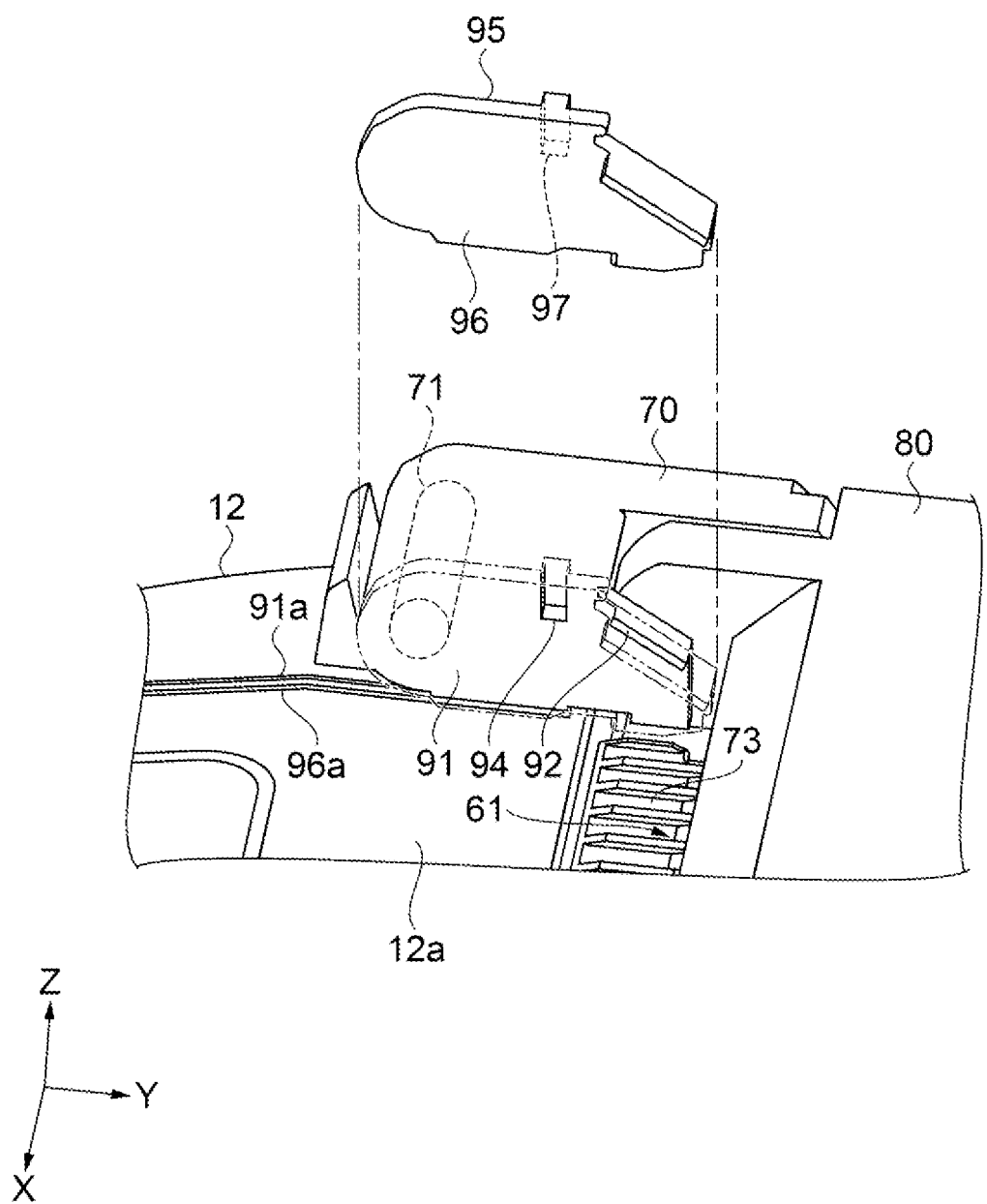
FIG. 5 is an enlarged perspective view describing a guide surface.

As illustrated in FIG. 5, as a placement surface on which the sheet D is placed, the recording device 10 includes the first placement surface 73 that is the upper surface of the first cover 70 and includes the reading position, and a second placement surface 12a that does not include the reading position. When the first cover 70 is in the first closed position, the second placement surface 12a is the upper surface of the housing 12 that configures the same plane as the first placement surface 73. The sheet D that has not yet been read by the imaging module 83 is placed on a region upstream of the nip roller pair 75 of the first placement surface 73 and on the second placement surface 12a.

The first cover 70 includes the first guide surface 91 that guides an edge in the width direction of the sheet D placed on the first and second placement surfaces 73 and 12a. Specifically, the first guide surface 91 is an inner surface of a portion of the first cover 70 covering the right-hand side first support shaft 71 that rotatably supports the first cover 70. The first guide surface 91 includes a Y-Z plane intersecting an axial direction of the first support shaft 71. The first guide surface 91 extends in the downstream direction from the upper side of the first support shaft 71, and is connected to the right end of the first placement surface 73 located downstream of the first support shaft 71. The first guide surface 91 guides an edge 93a, on the right-hand side in the width direction, of a carrier sheet 93 to be described below. The first guide surface 91 includes a pressing surface 92 disposed vertically above the sheet D placed on the first placement surface 73. The pressing surface 92 is a surface that extends from the upper end of the first guide surface 91 toward the first placement surface 73 so as to form an eaves shape, and faces the upper surface of the sheet D placed on the first placement surface 73.

Figure 6:
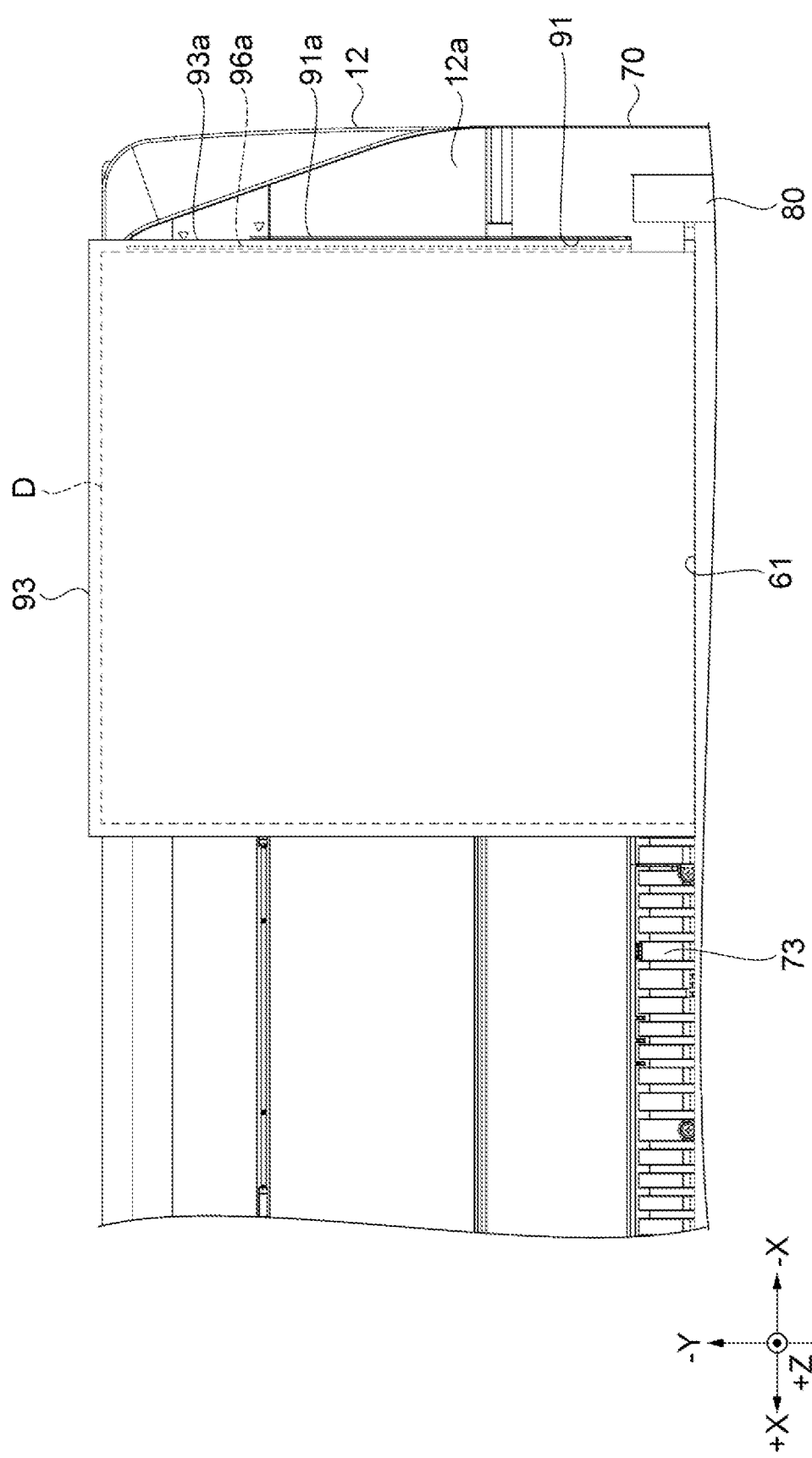
FIG. 6 is a plan view illustrating the recording device on which a medium to be read is placed.

As illustrated in FIG. 6, when causing the imaging module 83 to read the recording information on the sheet D, in order to protect a front surface of the sheet D and smoothly transport the sheet D on the transport path, the sheet D may be transported using a mode in which the sheet D is sandwiched by the carrier sheet 93. The carrier sheet 93 is a PET sheet configured by adhering tip portions of two sheets, which are a transparent cover sheet covering the front surface of the sheet D to be read by the reading unit 60 and an opaque support sheet covering a back surface of the sheet D. The carrier sheet 93 is configured to position the sheet D of a regular size in a predetermined position.

The second placement surface 12a is provided with a first mark 91a extending in a straight line from the rear end of the first guide surface 91 toward the rear side of the second placement surface 12a. The first mark 91a is a mark indicating a placement position, parallel to the Y axis direction, that is used when the sheet D sandwiched by the carrier sheet 93 is placed on the second placement surface 12a, and the first guide surface 91 is a reference position, parallel to the Y axis direction, used when the sheet D sandwiched by the carrier sheet 93 is set on the first placement surface 73. When setting the sheet D sandwiched by the carrier sheet 93 on the first placement surface 73, the user aligns the right-hand side edge 93a, which is parallel to the Y axis direction, of the carrier sheet 93 with the first mark 91a, and causes the carrier sheet 93 to slide toward the front of the reading device 10 while keeping the carrier sheet 93 in contact with the first guide surface 91. When the tip of the carrier sheet 93 reaches a predetermined position, the carrier sheet 93 is transported while being nipped by the nip roller pair 75, and is set in the predetermined reading start position.

The first placement surface 73 and the first guide surface 91 are configured to be included in the first cover 70, and thus pivot integrally with the first cover 70. Further, since the nip roller pair 75 that nips the sheet D placed on the first placement surface 73 is configured to be provided in the first cover 70 and the second cover 80 coupled to the first cover 70, the nip roller pair 75 pivots integrally with the first cover 70 together with the second cover 80. In other words, the first placement surface 73, the first guide surface 91, and the nip roller pair 75 move in an integrated manner.

As illustrated in FIG. 5, the recording device 10 includes an attachment 95, which is detachable from the first guide surface 91 and includes a second guide surface 96. In a state in which the attachment 95 is attached to the first guide surface 91, an outer surface covering the first guide surface 91 from the left-hand side is the second guide surface 96 that guides a right-hand side edge Da in the width direction of the sheet D. The attachment 95 is shaped so as to follow the shape of the first guide surface 91. The first guide surface 91 is provided with a recessed portion 94 that has an opening in the upper side thereof and is recessed in a rectangular shape that is long in the vertical direction. On a back surface of the attachment 95 on the opposite side from the second guide surface 96, a protruding portion 97 is provided that protrudes so as to be engageable with the recessed portion 94. The attachment 95 can be mounted on the first guide surface 91 from the upper and left sides, and, in a state in which the attachment 95 is attached, the recessed portion 94 of the first guide surface 91 and the protruding portion 97 of the attachment 95 are engaged with each other. The attachment 95 is attached to the first guide surface 91 and moves integrally with the first placement surface 73.

Figure 7:
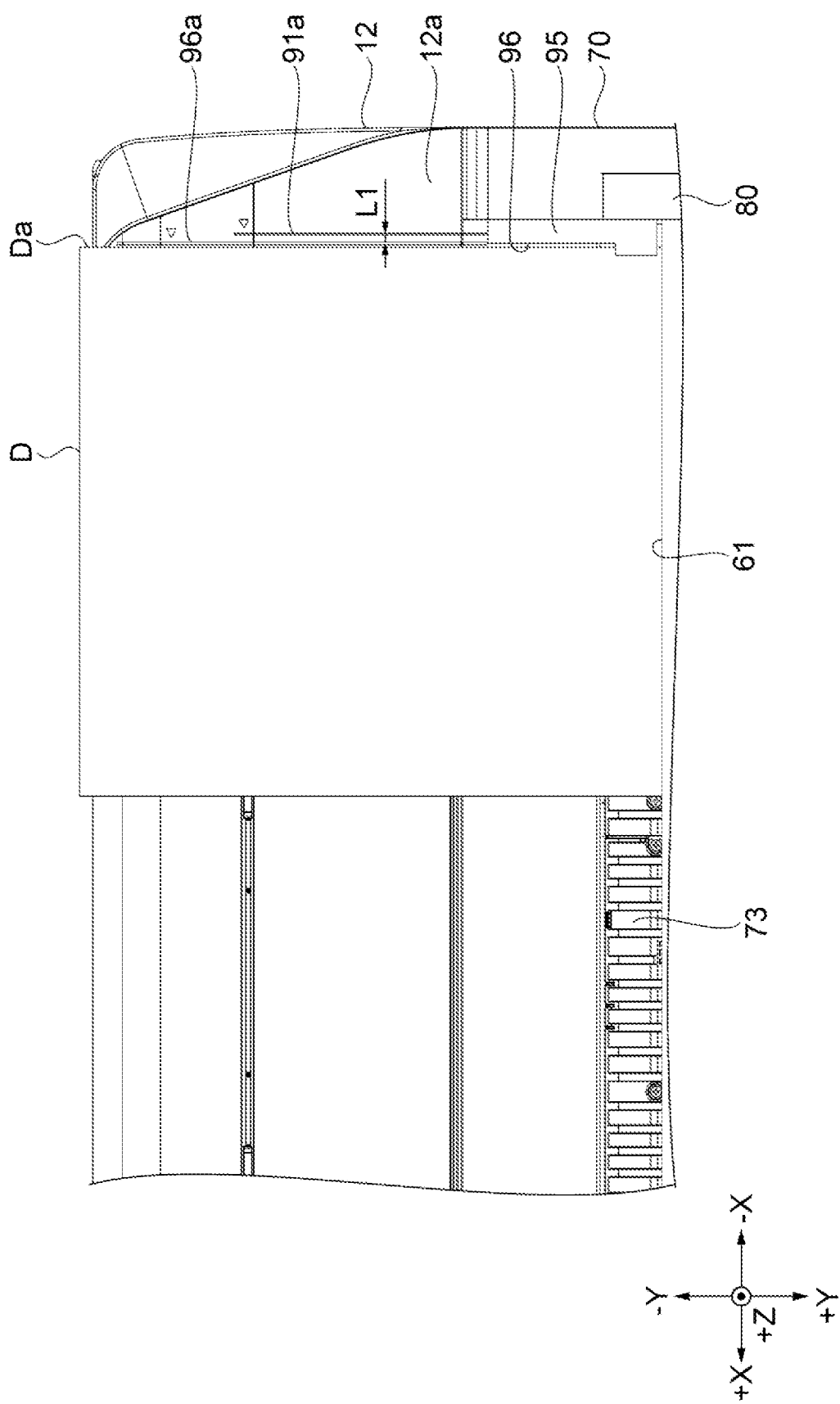
FIG. 7 is a plan view illustrating the recording device on which the medium to be read is placed.

As illustrated in FIG. 7, on the upper surface of the second placement surface 12a, a second mark 96a is provided that extends in a straight line from the rear end of the second guide surface 96 of the attachment 95 toward the rear side of the second placement surface 12a. The second mark 96a is a mark indicating a placement position, parallel to the Y axis direction, that is used when the sheet D is placed on the second placement surface 12a, and the second guide surface 96 is a reference position, parallel to the Y axis direction, that is used when the sheet D is set on the first placement surface 73. When setting the sheet D on the first placement surface 73, the user aligns the right-hand side edge Da, which is parallel to the Y axis direction, of the sheet D with the second mark 96a, and causes the sheet D toward the front of the reading device 10 while keeping the sheet D in contact with the second guide surface 96. When the tip of the sheet D reaches a predetermined position, the sheet D is transported while being nipped by the nip roller pair 75, and is set in the predetermined reading start position.

A difference L1 between the position of the first guide surface 91 and the first mark 91a, and the position of the second guide surface 96 and the second mark 96a in the X axis direction is equal to a difference between the right-hand side edge 93a, which is parallel to the Y axis direction, of the carrier sheet 93 and the right-hand side edge Da, which is parallel to the Y axis direction, of the sheet D sandwiched by the carrier sheet 93. As described above, when the carrier sheet 93 is brought into contact with the first guide surface 91, the right-hand side edge Da of the sheet D sandwiched by the carrier sheet 93 is positioned at the same position as the second guide surface 96 and the second mark 96a. In other words, the recording device 10 is configured such that by attaching or detaching the attachment 95, the edge Da of the sheet D to be read by the imaging module 83 can be set in a predetermined position even when the carrier sheet 93 is used, or even when the carrier sheet 93 is not used.

Figure 8:
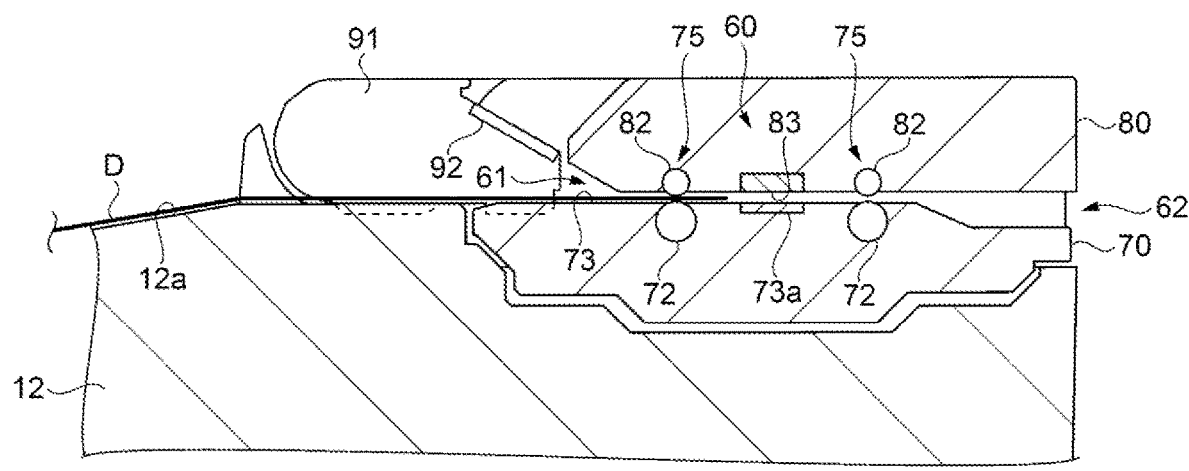
FIG. 8 is an enlarged side cross-sectional view illustrating the recording device in a state in which the first cover is positioned in a first closed position.
Figure 9:
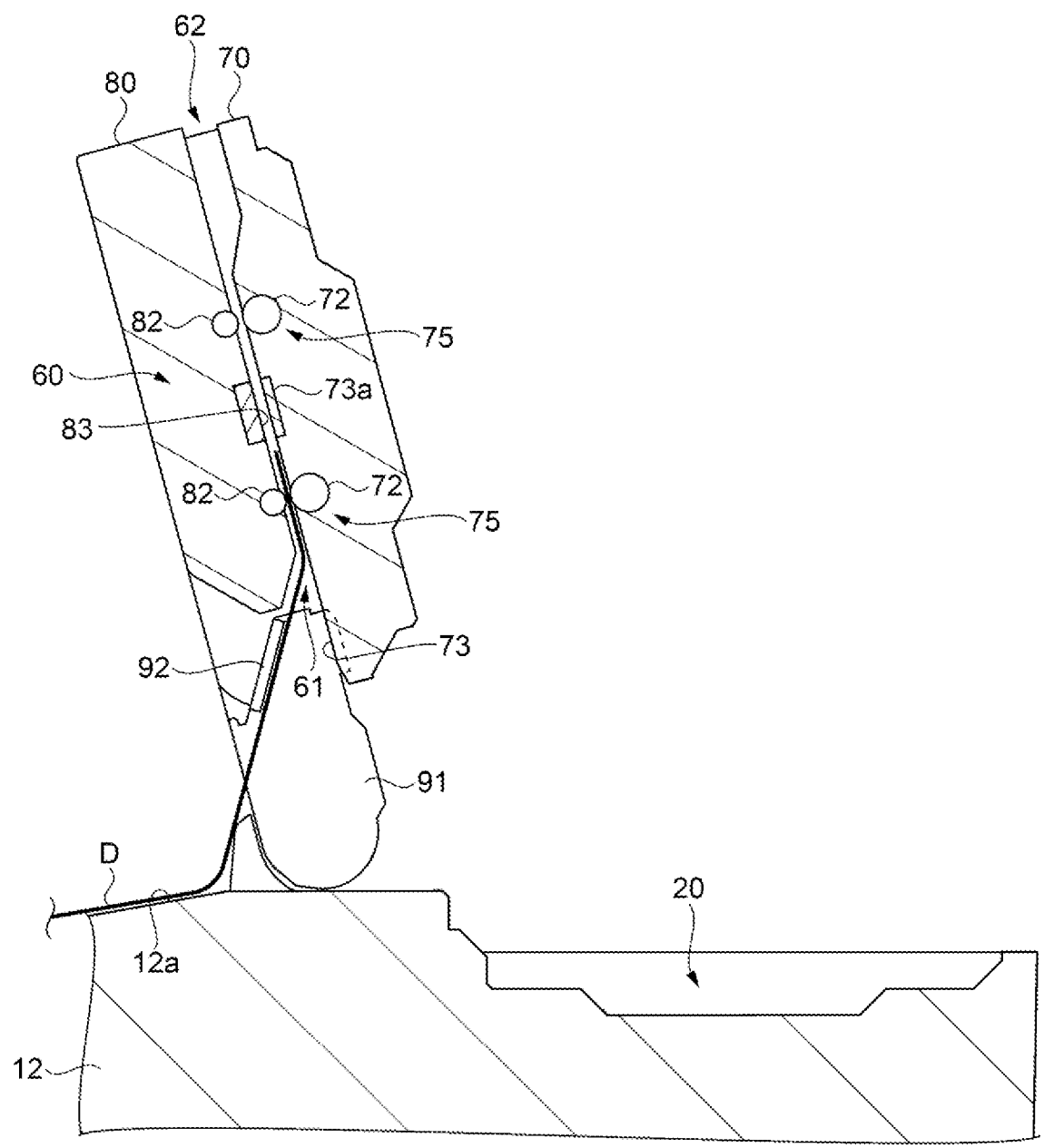
FIG. 9 is an enlarged side cross-sectional view illustrating the recording device in a state in which the first cover is positioned in the first open position.

As illustrated in FIG. 8 and FIG. 9, the first guide surface 91, the first placement surface 73, and the nip roller pair 75 pivot integrally with the first cover 70. In a state in which the sheet D is set in the reading start position, when there is a need to pivot the first cover 70 to the first open position for maintenance of the recording unit 20 or the like, the sheet D pivots integrally with the first cover 70 while being nipped by the nip roller pair 75 and supported by the first placement surface 73 and the first guide surface 91. Further, when the sheet D attempts to float from the first placement surface 73 as the first cover 70b is pivoted, the pressing surface 92 protruding from the first guide surface 91 vertically above the sheet D suppresses the floating thereof. As a result, thereafter, even when the first cover 70 is returned to the first closed position, the sheet D is maintained in the state of being set in the reading start position, and thus, time and effort to once more set the sheet D is saved. Further, since an upstream rear end portion of the pressing surface 92 is located downstream of the first support shaft 71, even when the first cover 70 is pivoted to the first open position, the rear end portion of the pressing surface 92 does not come into contact with the second placement surface 12a. As a result, damage to the sheet D caused by the sheet D being sandwiched between the rear end portion of the suppressing surface 92 and the second placement surface 12a is suppressed.

As described above, according to the recording device 10 of this embodiment, the following effects can be obtained.

The recording device 10 includes the nip roller pair 75 that nips the sheet D, the first placement surface 73 on which the sheet D is placed, and the first guide surface 91 that guides the edge in the width direction of the sheet D. When maintenance or the like is required during a reading operation, the nip roller pair 75, the first placement surface 73, and the first guide surface 91 move in an integrated manner while the sheet D placed on the first placement surface 73 is maintained in the state of being nipped by the nip roller pair 75. At this time, since the edge of the sheet D is not in sliding contact with the first guide surface 91, a change in the posture of the sheet D placed on the first placement surface 73 is suppressed. Further, damage to the sheet D caused by the sliding contact between the edge of the sheet D and the first guide surface 91 is suppressed.

The recording device 10 includes the first cover 70 that is capable of opening the recording unit 20 that performs the recording on the sheet S. The first placement surface 73 on which the sheet D is placed, and the first guide surface 91 that guides the edge Da of the sheet D are included in the first cover 70. In other words, since the first placement surface 73 and the first guide surface 91 are configured integrally with the first cover 70, it is possible to reduce the number of components of the recording device 10.

The recording device 10 includes the attachment 95 that is detachable from the first guide surface 91 and includes the second guide surface 96. Since a guide position of the sheet D can be changed by attaching and detaching the attachment 95, the guide position can be changed in accordance with a mode in which the sheet D is read, such as a mode in which the sheet D is read using the carrier sheet 93, for example.

The attachment 95 includes the protruding portion 97 that can be engaged with the recessed portion 94, which is provided in the first guide surface 91. Since the attachment 95 is attached to the first guide surface 91 by engaging the recessed portion 94 and the protruding portion 97 with each other, it is possible to prevent the attachment 95 from being detached unintentionally, for example, when the attachment 95 is moved integrally with the first placement surface 73.

Since the first guide surface 91 includes the pressing surface 92 disposed vertically above the sheet D placed on the first placement surface 73, the change in the posture of the sheet D placed on the first placement surface 73 is further suppressed.

What is claimed is:

1. A recording device comprising:
an imaging module configured to read a medium to be read placed in a reading position;
a placement surface at which the medium to be read is placed;
a first guide surface configured to guide an edge in a width direction of the medium to be read placed at the placement surface;
a nip roller configured to nip the medium to be read at the placement surface and transport the medium to be read to the reading position;
a first cover configured to expose a recording unit that performs recording on a recording medium when in a first open state;
a second cover configured to expose the reading position when in a second open state, the second cover being configured to move with the first cover when the first cover is moved to the first open state, wherein
the placement surface includes a first placement surface including the reading position, and a second placement surface not including the reading position,
the first placement surface and the first guide surface are included in the first cover and the nip roller is included in one of the first and second covers, and
the first placement surface, the first guide surface, and the nip roller move in an integrated manner when the first cover is moved to the first open state.

2. The recording device according to claim 1, comprising:
an attachment detachable from the first guide surface and including a second guide surface, wherein
in a state of being attached to the first guide surface, the attachment moves integrally with the placement surface.

3. The recording device according to claim 2, wherein
in the state in which the attachment is attached to the first guide surface, a recessed portion provided at the first guide surface is engaged with a protruding portion provided at the attachment.

4. The recording device according to claim 1, wherein
the first guide surface includes a pressing surface vertically above the medium to be read placed at the first placement surface.

* * * * *